(12) United States Patent
Eidsmore

(10) Patent No.: US 6,308,994 B1
(45) Date of Patent: Oct. 30, 2001

(54) FLUID FITTING WITH TORQUE SUPPRESSION ARRANGEMENT

(75) Inventor: Paul G. Eidsmore, Santa Cruz, CA (US)

(73) Assignee: Swagelok Company, Solon, OH (US)

( * ) Notice: Subject to any disclaimer, the term of this patent is extended or adjusted under 35 U.S.C. 154(b) by 0 days.

(21) Appl. No.: 09/057,066

(22) Filed: Apr. 8, 1998

Related U.S. Application Data

(60) Provisional application No. 60/042,714, filed on Apr. 8, 1997.

(51) Int. Cl.⁷ .................................................. F16L 19/02
(52) U.S. Cl. ......................... 285/279; 285/328; 285/281
(58) Field of Search .................................. 285/328, 279, 285/280, 281, 276

(56) References Cited

U.S. PATENT DOCUMENTS

| 1,074,319 | * | 9/1913 | Giovannoni | 285/280 |
| 1,297,370 | * | 3/1919 | Loomis | 285/281 |
| 1,703,696 | | 2/1929 | Stratford . | |
| 1,825,774 | * | 10/1931 | Boynton | 285/280 |
| 1,928,076 | * | 6/1933 | Rudolph | 285/281 |
| 2,176,323 | * | 10/1939 | Bowen et al. | 285/281 |
| 2,227,105 | * | 12/1940 | Pritchard | 285/281 |
| 2,379,035 | * | 6/1945 | Phillips | 285/281 |
| 2,421,974 | * | 6/1947 | Vandervoort | 285/281 |
| 2,509,090 | * | 5/1950 | Faccou | 285/281 |
| 3,521,910 | | 7/1970 | Callahan, Jr. et al. . | |
| 4,660,868 | | 4/1987 | Totani . | |
| 5,058,935 | | 10/1991 | Eidsmore . | |
| 5,129,688 | | 7/1992 | McGarvey . | |
| 5,160,178 | | 11/1992 | Iwabuchi . | |

FOREIGN PATENT DOCUMENTS

| 3809062 | * | 9/1989 | (DE) | 285/281 |
| 405141576 | * | 6/1993 | (JP) | 285/328 |
| 406117587 | * | 4/1994 | (JP) | 285/328 |

* cited by examiner

Primary Examiner—Eric K. Nicholson
(74) Attorney, Agent, or Firm—Calfee, Halter & Griswold, LLP

(57) ABSTRACT

A coupling assembly includes a pair of glands having ends that seal on opposite faces of a seal member. A coupling nut assembly cooperates with the glands to urge the ends against the seal member. A torque suppression assembly is mounted on a groove of the gland to limit rotational forces from the coupling nut assembly to the gland. The torque suppression assembly includes a thrust member that engages the coupling nut assembly and a bearing member that transfers axial make-up forces from the thrust member to the gland and rotates relative to the thrust member to reduce the torque transfer.

8 Claims, 3 Drawing Sheets

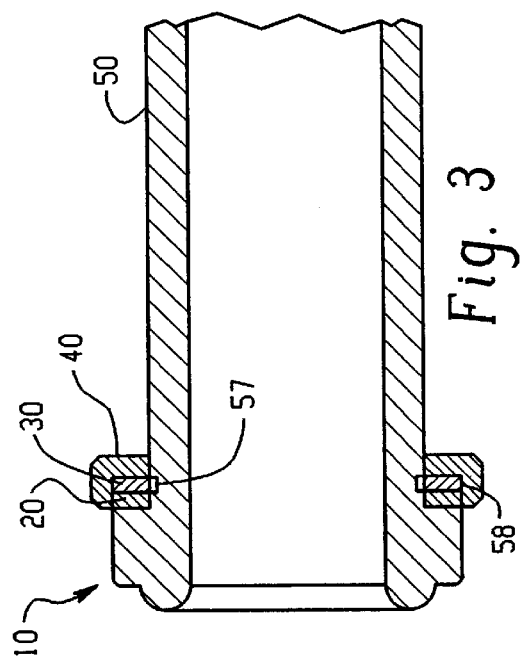
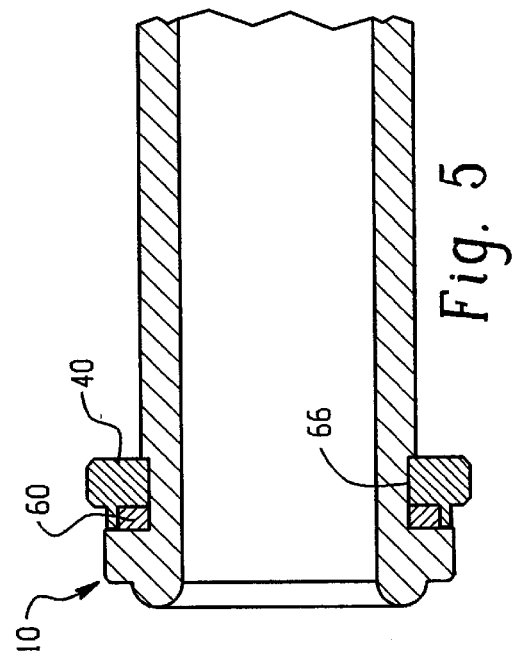
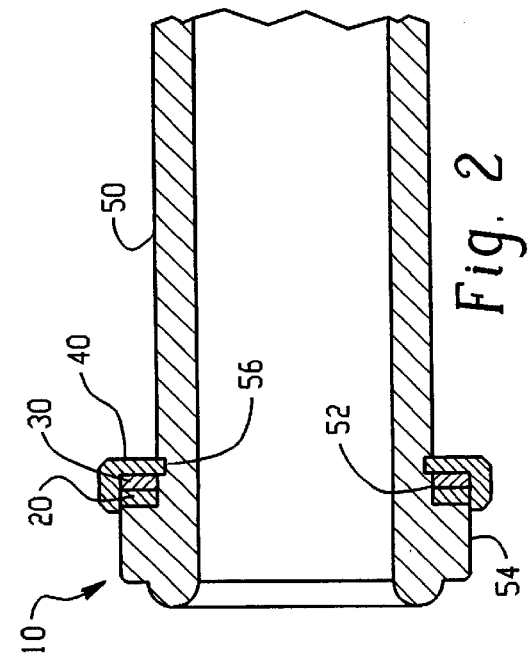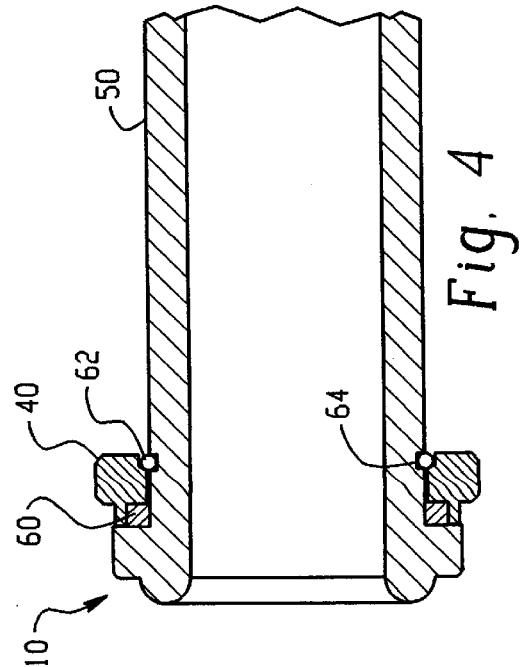

FLUID FITTING WITH TORQUE SUPPRESSION ARRANGEMENT

This application claims benefit of Provisional application 60/042714, filed Apr. 8, 1997.

BACKGROUND OF THE INVENTION

The subject invention is directed toward the art of pipe joints and couplings and, more particularly, to an improved tube coupling. The coupling of the invention is particularly suited for use in ultra-high vacuum applications and will be described with reference thereto; however, it should be appreciated that the invention is capable of broader application and could be used in different fluid systems operating under a variety of conditions.

In U.S. Pat. No. 3,521,910 to Callahan, et al., there is disclosed a tube coupling which has achieved commercial success and is widely used in both pressure and vacuum operations. It finds widespread acceptance for use in ultra-high vacuum applications. The coupling of the noted patent generally comprises first and second annular coupling components having axial through passages and end faces which extend perpendicular to the axis of the passages. The end faces provide sealing surfaces for the coupling end and typically include an annular rib, or bead-like protuberance generally of hemispherical cross-section, which extends outwardly from each end face about the through passage. A smooth, flat annular metal sealing gasket is trapped between the opposed end faces. A threaded coupling nut or nuts act to drive the coupling components toward one another to produce sealing engagement of the annular ribs with opposite end faces of the annular sealing gasket.

During make-up of the coupling, it is highly preferable that relative rotation between the coupling components and the sealing washer be minimized. That is, it is desirable to suppress or eliminate any such relative motion which could produce undesirable scoring or galling of the sealing washer and/or the sealing end faces. Such scoring or galling can drastically reduce the effectiveness of the joint or produce undesired particles. In fact, under certain circumstances, leaks can develop and the ability to remake the joint after disassembly can be lost.

Various efforts have been proposed to prevent the relative rotation and reduce torque transmission from the coupling nut to one or the other of the coupling components. For example, U.S. Pat. No. 5,058,935, commonly owned and invented by the owner and inventor of the present application, discloses one manner of trying to suppress torque in coupling assemblies of this type. The disclosure of that patent is hereby incorporated by reference into the present application.

It has also been proposed to install anti-friction thrust bearings between the coupling nut and the associated coupling component. The driving forces from the coupling nut to the coupling components are thus directed through the thrust bearings. The intent is that the bearings transmit the axial make-up forces without the transmission of torque to the coupling components. Both standard and special ball and needle type thrust bearing assemblies have been used for this purpose. A commercial example of such an arrangement is the PURERING assembly sold by Fujikin Inc. in which the bearing ring is disposed over the gland and is axially interposed between the rear face of the gland and the radial shoulder of the female nut. Thus, torque is intended to be transferred to the bearing ring from the female nut, but not transferred to the coupling member, and likewise not transferred to the gasket. This arrangement, however, requires an enlarged nut to accommodate the bearing ring and the bearing ring is another component of the assembly that the user must handle.

Although the thrust bearing approach has been somewhat satisfactory, it is generally undesirable in that it significantly increases the cost and complexity of the coupling assemblies. Moreover, the addition of the anti-friction thrust bearings can significantly increase the overall length of the coupling assemblies. Accordingly, there has existed an ongoing need for a design to prevent relative rotary movement between the sealing faces of the coupling components and/or between the coupling components and the seal ring.

Another approach has been to use anti-torque prongs or interlocking tabs such as used in the Cajon S type VCR and the OmniSafe torque suppressors. These designs add complexity for the user and make them incompatible with existing VCR fittings already in use.

BRIEF DESCRIPTION OF THE INVENTION

The subject invention provides a coupling structure which overcomes the noted problems in an extremely efficient and economical manner.

According to the present invention, a bearing is made integral to the gland.

According to another aspect of the invention, the thrust plate is an independent part separated from the gland by a bearing, as opposed to existing gland designs where the thrust plate and gland are one-piece and therefore the nut rotation against it tends to rotate the gland as well.

A principal advantage of the invention is that the thrust plate is free to rotate with the nut driving against it, transferring little or no torque to the gland.

Another advantage of the invention relates to the overall dimensions of the gland remaining identical to existing fitting designs and therefore compatible with all existing fittings already in use.

Yet another advantage of the invention resides in the fact that it does not require additional parts for the user to install, even though there may be an overall increase in the number of parts of the assembly.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in this specification and illustrated in the accompanying drawings. The drawings include:

FIG. 2 is a longitudinal cross-sectional view of a gland of the coupling assembly incorporating a thrust bearing assembly in accordance with the teachings of a first embodiment of the invention.

FIG. 3 is a longitudinal cross-sectional view of a gland of the coupling assembly incorporating a thrust bearing assembly in accordance with the teachings of a second embodiments the invention.

FIG. 4 is a longitudinal cross-sectional view of a gland of the coupling assembly incorporating a thrust bearing assembly in accordance with the teachings of a third embodiment of the invention.

FIG. 5 is a longitudinal cross-sectional view of a gland of the coupling assembly incorporating a thrust bearing assembly in accordance with the teachings of a fourth embodiment of the invention.

DETAILED DESCRIPTION OF THE PREFERRED EMBODIMENTS

Figure 1:
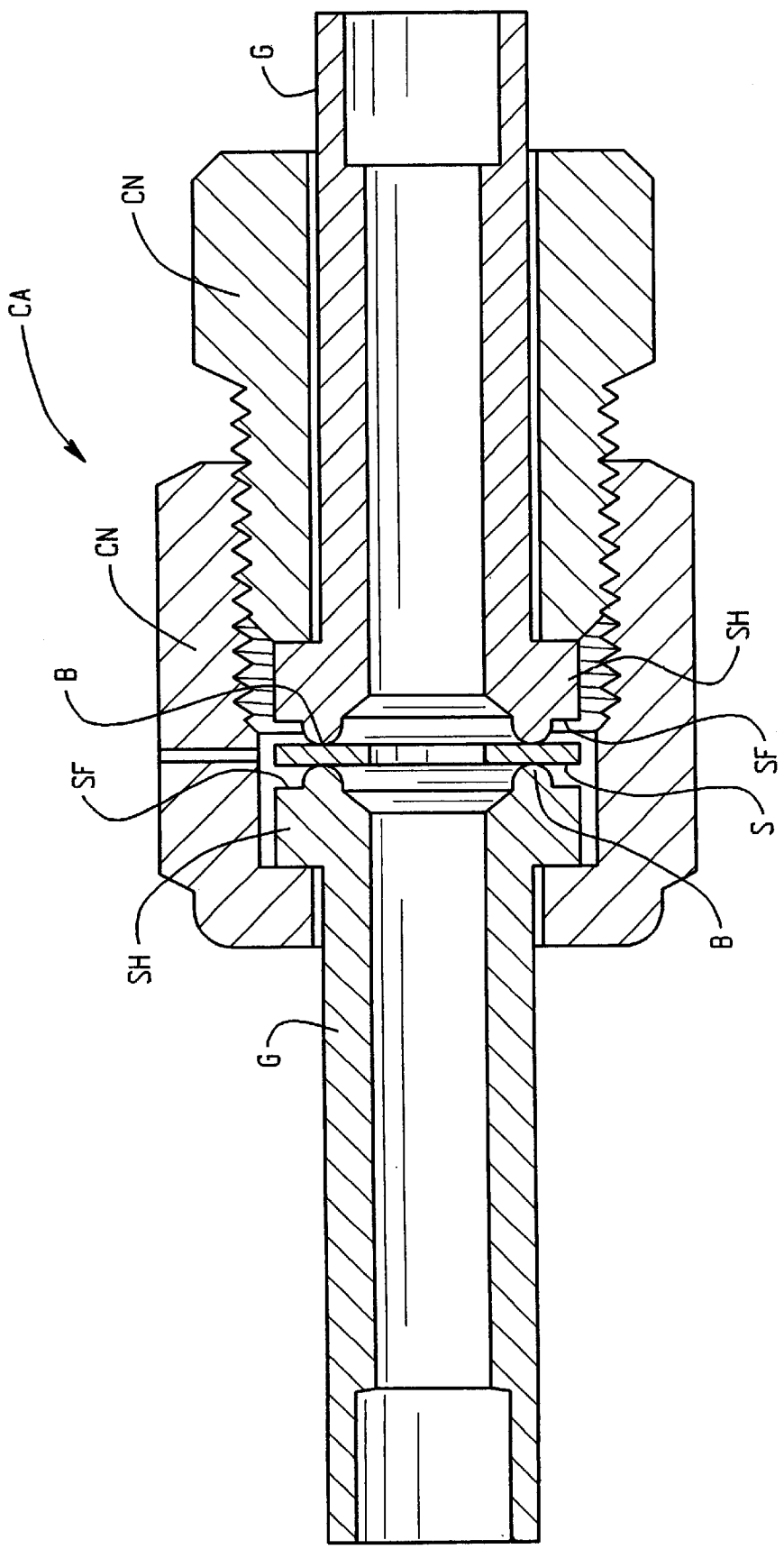
FIG. 1 which is a longitudinal cross-sectional view of a prior art;coupling assembly.

The drawings are for the purposes of illustrating the preferred embodiments of the invention only and are not intended to limit the invention. Referring to FIG. 1, one example of the prior art is generally illustrated as a coupling assembly CA that includes first and second glands or coupling members G having sealing faces SF brought into sealing engagement with end faces of a seal member or washer S. Each sealing face preferably includes a circumferential continuous bead B that extends axially outward for engaging the seal member. Radial shoulders SH are provided on the ends of the glands and operatively cooperate with a joining assembly such as the commonly used pair of coupling nuts CN that are threadably engaged for urging the glands into sealing engagement with the seal member.

As described above in the Background section, there have been a number of efforts to reduce the relative rotation between the coupling glands and the sealing washer. However, prior arrangements have been found unsatisfactory for one reason or another. The reduction of torque transmission from the coupling nut to one or both of the coupling glands is the goal of the present invention as shown and described with reference to the following embodiments.

FIG. 2 shows a stainless steel coupling member or gland 10, two hardened steel washers 20, 30 coated with a low friction material such as Teflon or nickel fluorine that acts as a bearing member, and a stainless steel thrust member or plate 40. The annular washers are dimensioned for axial sliding receipt over coupling member shaft 50 where they abut against a rear face 52 of radial shoulder 54 that includes the sealing face of the coupling member or gland 10. The thrust plate is then assembled onto the gland and compressed or crimped into a circumferential groove 56 in the gland shaft. This interfit prevents the washers and the thrust plate from sliding off the shaft but still allows the thrust plate to rotate relative to the gland. The thrust plate is also dimensioned to capture the outer radial edges of the washers and in this embodiment overlaps the radial shoulder of the gland.

FIG. 3 shows a design similar to FIG. 2 except instead of the thrust plate 40 being compressed into a groove, the second washer 30 is split and acts as a retainer clip engaging in a groove 57 in the gland 10 and a groove 58 in the thrust plate. The second washer therefore acts as a bearing and holds the parts together. No crimping or compression of the washers or thrust plate is required to assemble this embodiment. Additionally, the thrust plate axially overlaps with the radial shoulder of the gland, at least partially, and radially contains both of the washers.

FIG. 4 shows a design in which the washers have been removed and replaced with a single washer or bearing grade plastic ring 60 such as graphite filled P.E.E.K. (Poly ether ether ketone). The ring 60 and thrust plate are held in place by a wire retaining clip 62 behind the thrust plate that is received in a corresponding groove 64 in the shaft of the gland. The thrust plate is configured to receive the ring therein but does not axially overlap with the radial shoulder of the gland.

FIG. 5 uses a plastic bearing ring 60 and the thrust plate 40 is compressed into a gland groove 66 to hold the parts on the gland 10. The groove has an axial dimension sufficient to receive both the thrust plate and the bearing ring. Moreover, the bearing ring is radially contained by the thrust plate which has substantially the same outer radial dimension as the shoulder of the gland.

Figure 6:
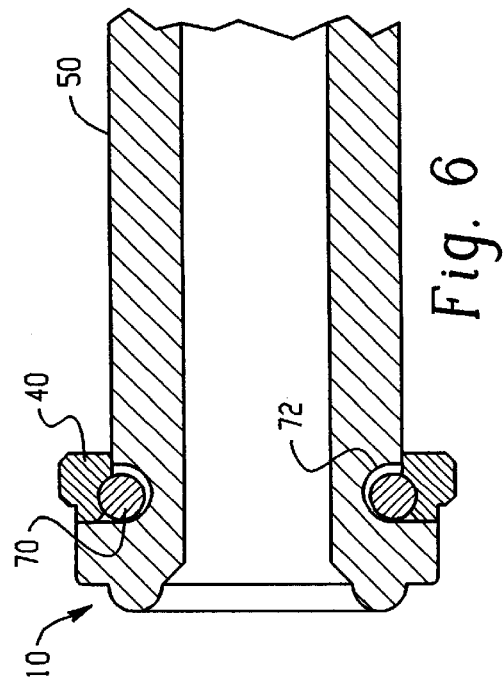
FIG. 6 is a longitudinal cross-sectional view of a gland of the coupling assembly incorporating a thrust bearing assembly in accordance with the teachings of a fifth embodiment of the invention.

FIG. 6 discloses an embodiment that uses spring wire formed in a circle 70. The ends of the spring wire are aligned and the circumferential gap between the ends allows the circumference to decrease slightly upon assembly, then the spring force returns the circumference of the spring wire to its original length. The spring is coated with a low friction coating such as TFE or nickel phosphorous. The thrust plate 40 is pressed over the spring wire 70 which snaps into an circumferential groove 72 on the shaft of the gland, holding the parts onto the gland.

Figure 7:
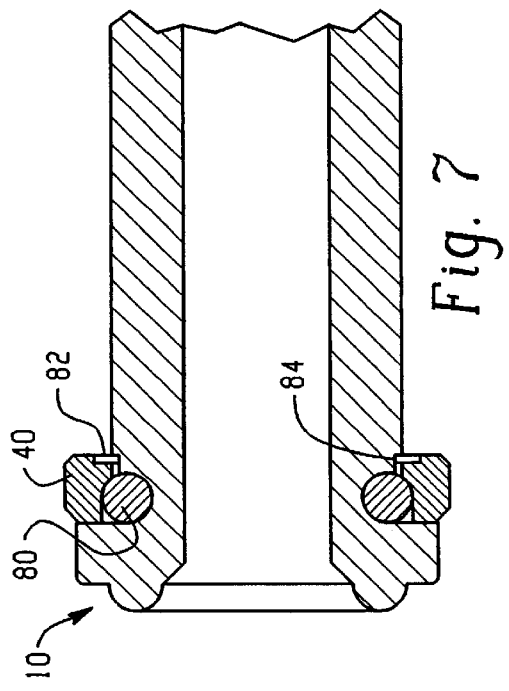
FIG. 7 is a longitudinal cross-sectional view of a gland of the coupling assembly incorporating a thrust bearing assembly in accordance with the teachings of a sixth embodiment of the invention.

In the embodiment of FIG. 7, ball bearings 80 are placed between the radial shoulder of the gland and the thrust plate 40. The ball bearings are received in a groove in the shaft of the gland and the thrust plate is received thereabout to retain the ball bearings in a radial direction. A retaining clip 82 is received in a channel 84 formed in the periphery of the shaft to axially retain the components together. The thrust plate can rotate relative to the ball bearings so that torque is not transferred to the gland.

Figure 9:
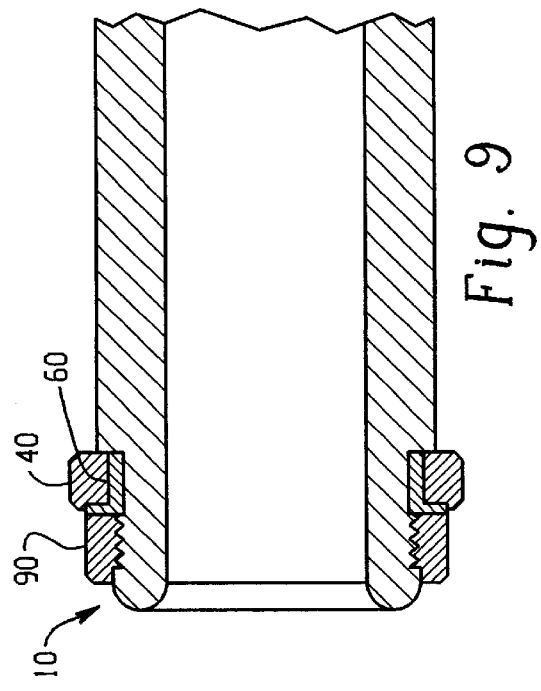
Figure 8:
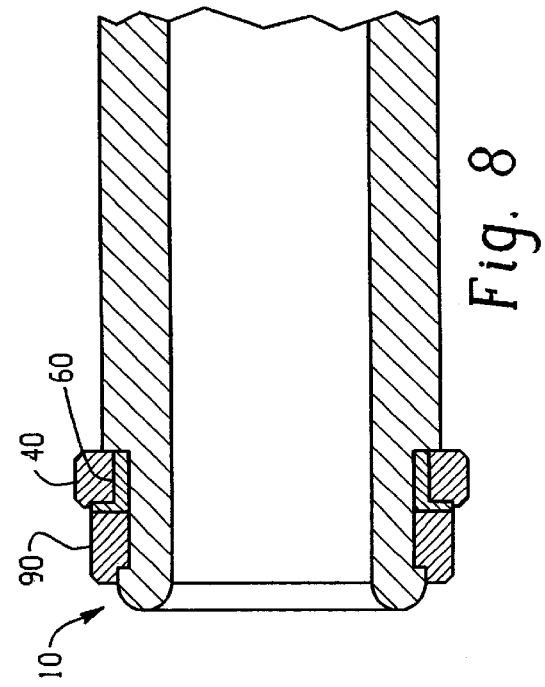
FIG. 8 is a longitudinal cross-sectional view of a gland of the coupling assembly incorporating a thrust bearing assembly in accordance with the teachings of a seventh embodiment of the invention.

The parts of FIGS. 8 and 9 are assembled from the seal end of the gland 10, i.e., received over the left-hand end of the gland as illustrated. The thrust plate and bearing material are installed over the sealing end of the gland since there is no enlarged radial shoulder on the gland as found in the embodiments of FIGS. 2–7. Particularly, the inner radial dimension of the thrust plate 40 is slightly greater than the seal end so that it can be axially received thereover. The bearing ring 60 has sufficient elasticity so that it can snap fit over the seal end of the gland. Lastly, a front collar 90 is either compressed over the gland (FIG. 8) or screwed onto the gland (FIG. 9) to axially retain the components together.

The invention has been described with reference to the preferred embodiments. Obviously, modifications and alterations will occur to others upon a reading and understanding of this specification. For example, a seal arrangement different than the illustrated annular bead can incorporate the subject invention with equal success. Likewise, different materials of construction can be used without departing from the intent of the invention. The invention is intended to include all such modifications and alterations insofar as they come within the scope of the appended claims or the equivalents thereof.

Having thus described the invention, it is now claimed:

1. A fluid coupling assembly for limiting torque transfer therethrough comprising:

a first annular gland having a through passage that communicates with an end thereof;

a second annular gland having a through passage that communicates with an end thereof;

a seal member interposed axially between the ends of the first and second glands;

a threaded coupling nut assembly for axially urging the gland ends into engagement with the seal member; and a torque suppression assembly operatively mounted on at least one gland for limiting the transfer of rotational forces from the coupling nut assembly to the at least one gland; wherein the torque suppression assembly includes a groove formed in the at least one gland adjacent the end thereof;

said torque suppression assembly comprising a low friction washer and a thrust member both retained on at least one of said glands; said washer abutting a portion of said at least one gland, and said thrust member being axially disposed for abutting engagement with said coupling nut assembly and said washer;

wherein said thrust member radially captures the washer.

2. A fluid coupling assembly for limiting torque transfer therethrough comprising:

a first annular gland having a through passage that communicates with an end thereof;

a second annular gland having a through passage that communicates with an end thereof;

a seal member interposed axially between the ends of the first and second glands;

a threaded coupling nut assembly for axially urging the gland ends into engagement with the seal member; and a torque suppression assembly operatively mounted on at least one gland for limiting the transfer of rotational forces from the coupling nut assembly to the at least one gland; said at least one gland having a groove adjacent the end thereof;

said torque suppression assembly comprising a low friction washer and a thrust member both retained on at least one of said glands; said washer abutting a portion of said at least one gland, and said thrust member being axially disposed for abutting engagement with said coupling nut assembly and said washer;

wherein a portion of the washer is received in said groove and the thrust member includes a groove for receiving another portion of said washer.

3. The fluid coupling assembly of claim 2 wherein the thrust member is received in the groove to retain the torque suppression assembly on the at least one gland.

4. The fluid coupling assembly of claim 3 wherein the at least one gland includes a radial shoulder adjacent the end for transferring axial make-up forces from the coupling nut assembly to the at least one gland.

5. The fluid coupling assembly of claim 4 wherein said washer is axially interposed between the radial shoulder and the coupling nut assembly.

6. The fluid coupling assembly of claim 4 wherein the thrust member and said washer have inner diameters less than the gland shoulder.

7. The fluid coupling assembly of claim 2 wherein the torque suppression assembly includes a retaining ring received in the groove and axially retaining the thrust member and said washer on the at least one gland.

8. The fluid coupling assembly of claim 1 comprising a second washer axially disposed between said friction washer and said thrust member.

\* \* \* \* \*